(12) United States Patent
Jing et al.

(10) Patent No.: US 8,949,253 B1
(45) Date of Patent: Feb. 3, 2015

(54) LOW-OVERHEAD IMAGE SEARCH RESULT GENERATION

(75) Inventors: Yushi Jing, San Francisco, CA (US); Wei Cai, Atlanta, GA (US); Stephen C. Holiday, Brampton, CA (US)

(73) Assignee: Google Inc., Mountain View, CA (US)

( * ) Notice: Subject to any disclaimer, the term of this patent is extended or adjusted under 35 U.S.C. 154(b) by 316 days.

(21) Appl. No.: 13/480,240

(22) Filed: May 24, 2012

(51) Int. Cl.
*G06F 17/30* (2006.01)

(52) U.S. Cl.
USPC ............ 707/749; 707/723; 707/737; 707/748

(58) Field of Classification Search
USPC .................. 707/723, 737, 748, 749; 382/224
See application file for complete search history.

(56) References Cited

U.S. PATENT DOCUMENTS

| | | | | |
|---|---|---|---|---|
| 6,345,274 B1 * | 2/2002 | Zhu et al. | | 1/1 |
| 6,480,840 B2 * | 11/2002 | Zhu et al. | | 1/1 |
| 6,574,616 B1 * | 6/2003 | Saghir | | 382/305 |
| 7,860,317 B2 * | 12/2010 | Xie et al. | | 382/195 |
| 8,090,222 B1 * | 1/2012 | Baluja et al. | | 382/305 |
| 8,352,465 B1 * | 1/2013 | Jing et al. | | 707/723 |
| 8,429,173 B1 * | 4/2013 | Rosenberg et al. | | 707/748 |
| 8,566,331 B1 * | 10/2013 | Covell et al. | | 707/749 |
| 2007/0098266 A1 * | 5/2007 | Chiu et al. | | 382/224 |
| 2007/0133947 A1 * | 6/2007 | Armitage et al. | | 386/95 |
| 2008/0097981 A1 * | 4/2008 | Williams et al. | | 707/5 |
| 2009/0313239 A1 * | 12/2009 | Wen et al. | | 707/5 |
| 2011/0103699 A1 * | 5/2011 | Ke et al. | | 382/209 |
| 2011/0173190 A1 * | 7/2011 | van Zwol et al. | | 707/723 |
| 2013/0132402 A1 * | 5/2013 | Yang et al. | | 707/748 |
| 2014/0250109 A1 * | 9/2014 | Wang et al. | | 707/723 |

* cited by examiner

*Primary Examiner* — Jean M Corrielus
(74) *Attorney, Agent, or Firm* — Harrity & Harrity, LLP

(57) ABSTRACT

A device may be configured to identify a plurality of images that are similar to a query image; generate a plurality of sets of rankings of the identified images based on a plurality of image attributes; compare the generated plurality of sets of rankings of the identified images to a reference set of rankings of images; select, based on the comparing, a particular set of rankings; and rank a plurality of images that are associated with another query image, based on an attribute associated with the selected particular set of rankings.

20 Claims, 13 Drawing Sheets

1100

LOW-OVERHEAD IMAGE SEARCH RESULT GENERATION

BACKGROUND

The World Wide Web ("web") contains a vast amount of information. A search engine may assist a user in locating images, located on the web, that are similar to a query image.

Information retrieval systems, for example, Internet search engines, aim to identify resources, such as web pages, images, text documents, multimedia context, etc., that are relevant to a user's needs, and to present information about the resources in a manner that is most useful to the user. Internet search engines return a set of search results in response to a user submitted query. The search results identify resources responsive to a user's query. The identified resources can include varying types of content including documents, text, images, video, and audio.

In some information retrieval systems, a user can perform an image search. An image search is a search for image content responsive to an input query. An image can include a static graphic representative of some content, for example, photographs, drawings, computer generated graphics, advertisements, web content, book content. An image can also include a collection of image frames, for example, of a movie or a slideshow.

SUMMARY

According to some implementations, a method may include identifying a plurality of images that are similar to a query image; generating, by at least one of the one or more server devices, a plurality of sets of rankings of the identified images based on a plurality of image attributes; comparing, by at least one of the one or more server devices, the generated plurality of sets of rankings of the identified image results to a reference set of rankings of images; selecting, based on the comparing and by at least one of the one or more server devices, a particular set of rankings; and ranking, by at least one of the one or more server devices, a plurality of image results that are associated with another query image, based on an attribute associated with the selected particular set of rankings.

According to some implementations, selecting the particular set of rankings may include identifying that an order of image results in the particular set of rankings matches an order of images in the reference set more closely than orders of image results in the other sets of rankings, of the set of sets of rankings.

According to some implementations, the method may further include ranking the image results based on similarity of the image results to the first query image; grouping the image results, of the set of image results; and generating the reference ranking set by ranking the image results, of the set of image results, based on the grouping.

According to some implementations, grouping the image results may include identifying images, of the set of images, that are visually similar to each other, and grouping the images, of the set of images, that have been identified as being visually similar to each other.

According to some implementations, ranking the image results based on the grouping may include identifying, for each group, a similarity score based on a similarity of at least one image result in the group to the query image; ranking the image results based on similarity scores of respective groups associated with the image results.

According to some implementations, the other query image may be identical to the query image.

According to some implementations, the method may further include receiving a third query image; determining that the third query image is identical to or similar to the first query image; and storing information associating the particular attribute with the third query image based on determining that the third query image is identical to or similar to the first query image.

According to some implementations, a method may include receiving a first query image that is associated with a group of different attributes; receiving a first group of image results that are similar to the first query image; ranking the image results, of the first group of image results, based on similarity of the image results to the first query image; grouping the image results, of the first group of image results. The grouping may include identifying image results, of the first group of image results, that are visually similar to each other, and grouping image results, of the first group of image results, that have been identified as being visually similar to each other. The method may further include generating a reference ranking set by re-ranking the image results, of the first group of image results, based on the grouping; generating a group of ranked sets of image results. At least a particular one of the generated sets of image results may include the first group of image results, and each different set of image results may be ranked based on a different particular attribute of the group of different attributes. The method may also include comparing the group of ranked sets of image results to the reference ranking set; identifying a particular ranked set, of the group of ranked sets of image results, that has a ranking that is most similar to a ranking of the reference ranking set; identifying a particular attribute, based on which the particular ranked set is ranked; and ranking, based on the identified particular attribute, a second group of image results, based on receiving a second query image.

According to some implementations, ranking the image results of the second set of image results may include forgoing grouping the second set of image based on visual similarity.

According to some implementations, the method may further include storing information associating the query image with the particular attribute; and receiving, after storing the information, the second query image from a client device. The second query image may be a same image as the first query image. The method may further include receiving the second set of image results. The second set of image results may be similar to the second query image. The method may further include presenting, to the client device, information regarding the ranked image results, of the second set of image results.

According to some implementations, the method may further include receiving a third query image; determining that the third query image is identical to or similar to the first query image; and storing information associating the particular attribute with the third query image based on determining that the third query image is identical to or similar to the first query image.

According to some implementations, comparing the set of ranked sets of image results to the reference ranking set may include performing a Kendall's tau distance comparison between each ranked set, of the set of ranked sets of image results, to the reference ranking set.

According to some implementations, ranking the second set of image results, based on the identified attribute, may include using a function, that more heavily weights the identified attribute than other attributes, to calculate a weighted distance between each image result, of the second set of image results, and the second query image; and ranking the second set of image results based on the calculated weighted distances.

According to some implementations, the set of attributes may include a first quantity of different attributes, the generated set of ranked sets of image results may include a second quantity of ranked sets of image results, and the first quantity and the second quantity may be equal.

The above discussion mentions examples in which some implementations may be implemented via one or more methods. In some implementations, one or more systems and/or devices may be configured to perform one or more of the acts mentioned above. In some implementations, a computer-readable medium may include computer-executable instructions which, when executed by one or more processors, cause the one or more processors to perform one or more of the acts mentioned above.

An image search engine, according to one or more implementations described herein, may continuously analyze a query image and images associated with the query image over time to determine which attributes of the images to more heavily weight. Using such a technique, the image search engine of some implementations may continuously learn which attribute and/or attributes of the images to more heavily weight, in order to continuously generate more relevant image result rankings for the query image.

Furthermore, by identifying one or more attributes of the query image, the image search engine of some implementations may efficiently identify the relevant image results by storing an indication of which attribute and/or attributes of the image results to more heavily weight. Thus, in lieu of storing vast amounts of data that indicate how to identify relevant image results for an image, the image search engine may store an indication of one or more attributes, and may generate the image results based on the one or more attributes. Additionally, using a ranking technique that more heavily weights the attribute and/or attributes may consume less time and/or processing resources than other techniques of ranking image results.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

A system and/or method, described herein, may enable one or more devices, such as one or more server devices implementing an image search engine, to present images that are visually similar to a query image. As described below, the image search engine may analyze the query image and image results, associated with the query image, to determine one or more attributes of the image results to more heavily weight, than other attributes of the image results, when ranking the image results associated with the query image.

Figure 1A:
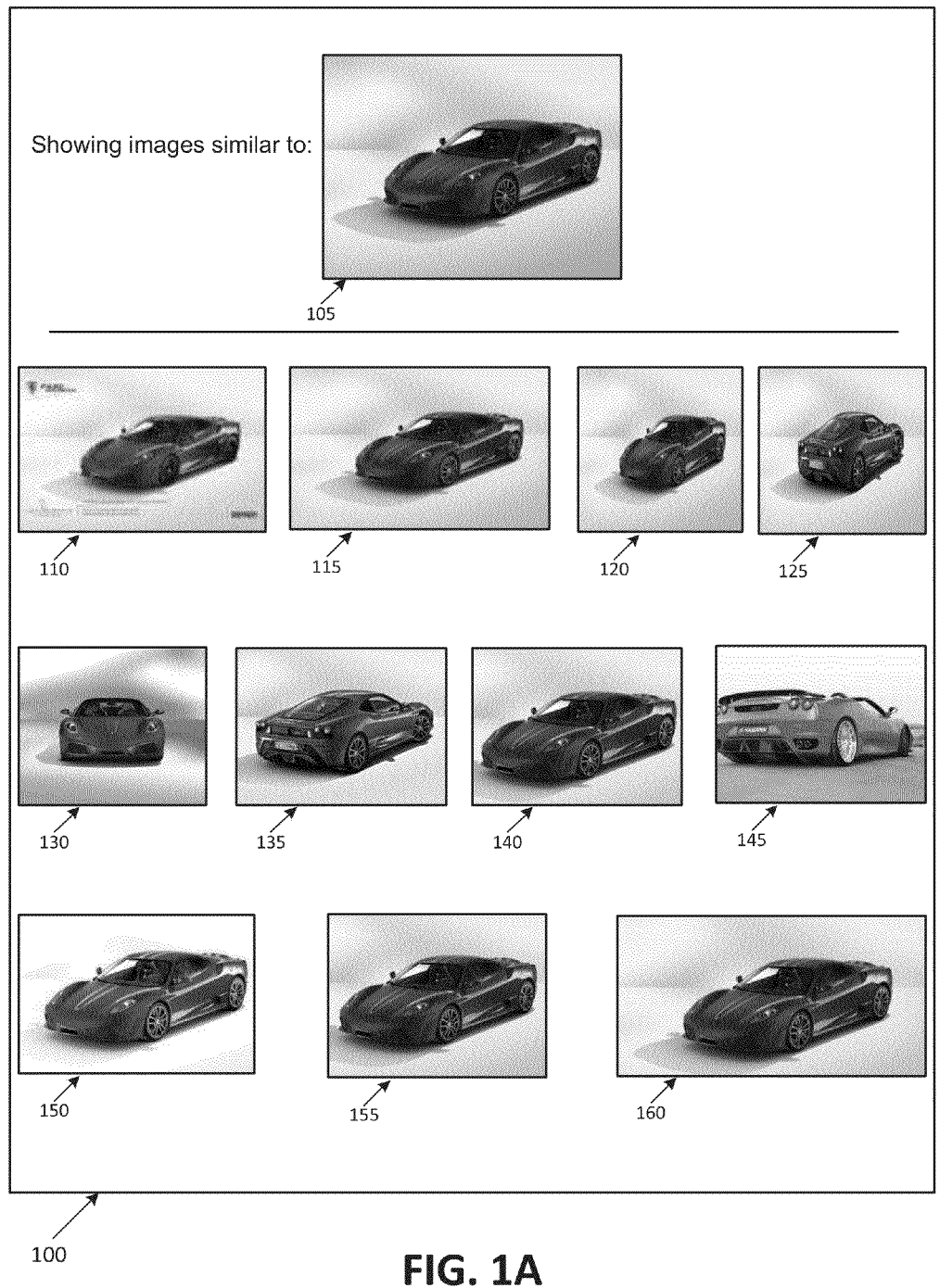
FIGS. 1A and 1B illustrate an overview of an example implementation described herein.
Figure 1B:
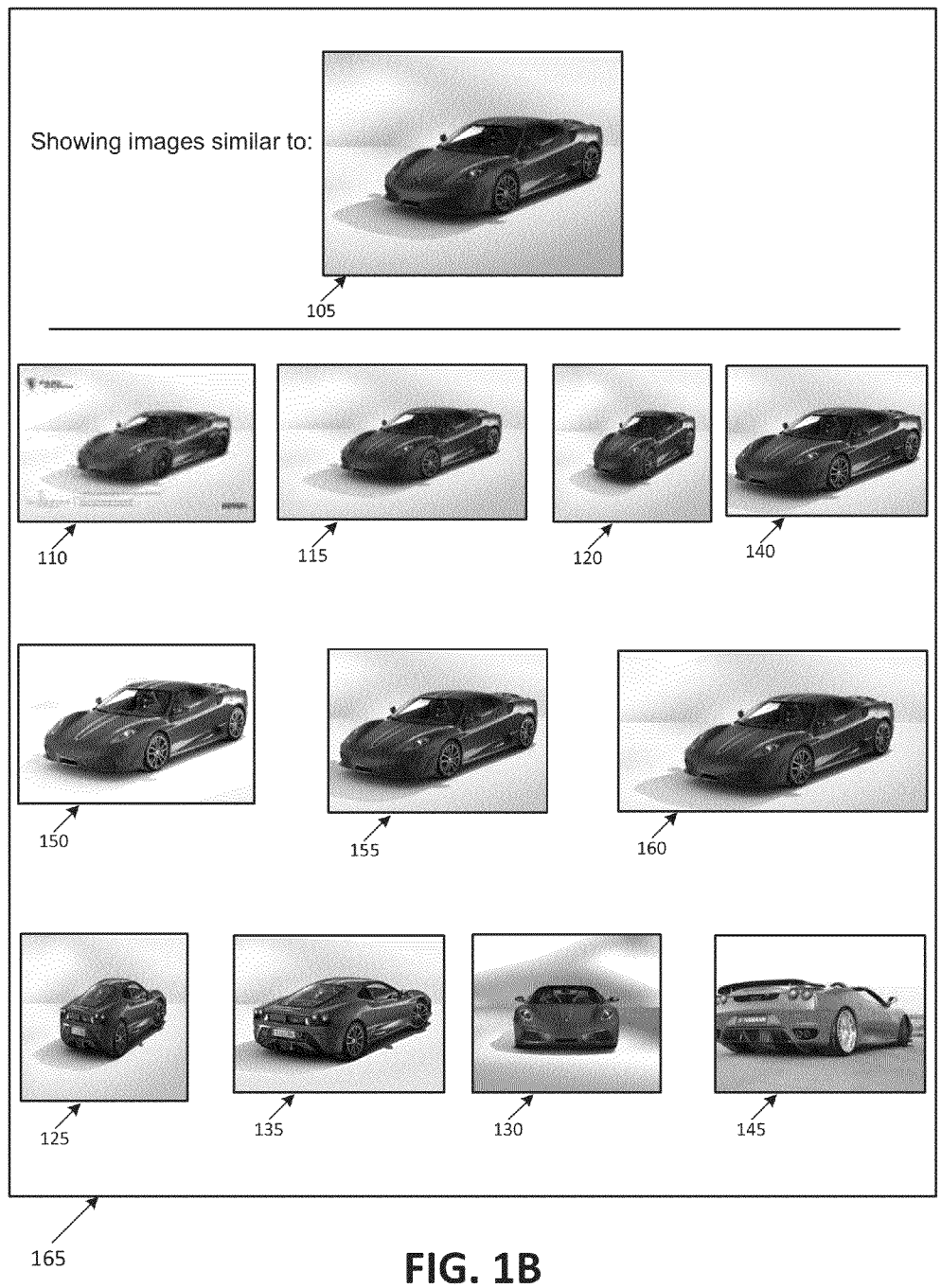

FIGS. 1A and 1B are diagrams of example user interfaces that illustrate one or more implementations described herein. FIG. 1A illustrates an example user interface 100, which may be provided by a search engine. User interface 100 may be displayed at a client device via a browser. User interface 100 may include information regarding image search results that are similar to query image 105. For example, user interface 100 may include thumbnail images that represent image search results 110-160.

Each of image search results 110-160 may be ranked by the search engine based on one or more criteria, such as a similarity of each image search result to query image 105; a similarity of each thumbnail image, corresponding to one of image search results 110-160, to query image 105; etc. As shown in FIG. 1A, one or more of image search results 110-160 may not be ranked optimally. That is, one or more image search results 110-160, which may be recognized by a user as being more visually similar to query image 105 than other image search results 110-160, may be ranked lower than the other search results 110-160.

For example, image search result 140 may be more visually similar to query image 105 than image search results 125-135, but the search engine may have ranked image search result 140 below image search results 125-135. Additionally, image search results 150-160 may be more visually similar to query image 105 than image search results 125-135 and 145, but the search engine may have ranked image search result 140 below image search results 125-135 and 145. Further still, image search result 135 may be more visually similar to query image 105 than image search result 130, but the search engine may have ranked image search result 135 below image search result 130.

FIG. 1B illustrates example user interface 165, which may be provided by a search engine according to one or more implementations described herein. User interface 165 may be displayed at a client device via a browser. User interface 165 may include information regarding image search results that are similar to query image 105. For example, user interface 165 may include thumbnail images that represent image search results 110-160.

Query image 105, shown in FIG. 1B, may be the same as query image 105, shown in FIG. 1A. Additionally, image search results 110-160, shown in FIG. 1B, may be the same as image search results 110-160, shown in FIG. 1A. The ranking of image search results 110-160, shown in FIG. 1B, may be different than the ranking of image search results 110-160, shown in FIG. 1A. For example, in FIG. 1B, image search results 110-120, 140, and 150-160 may be ranked higher than image search results 125-130 and 145. Additionally, in FIG. 1B, image search results 125 and 135 may be ranked higher than image search results 130 and 145.

The ranking shown in FIG. 1B may more closely match a ranking that is based on how visually similar a user may perceive a search image result to be to a query image, such as query image 105. Additionally, search image results that are visually similar to each other may be consecutively ranked. For example, image search results 110-120, 140, and 150-160 may be consecutively ranked, as opposed to other image search results being ranked between image search results 110-120, 140, and 150-160.

Figure 2:
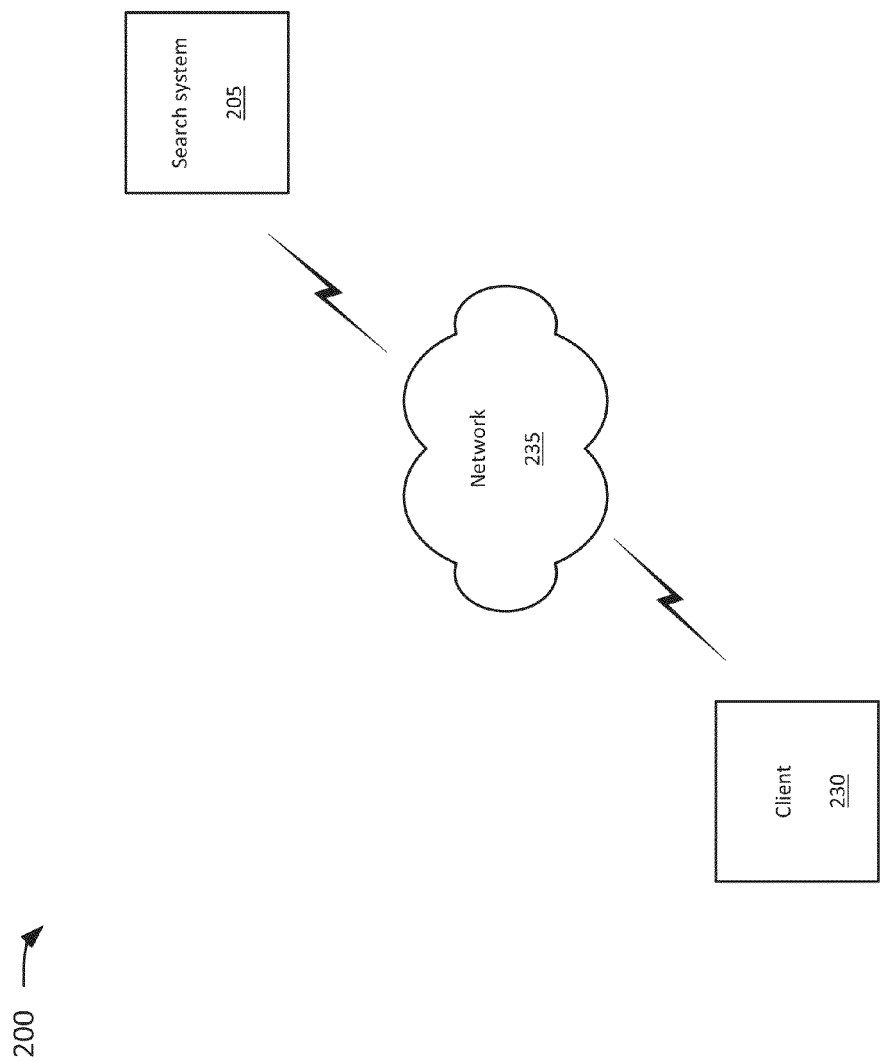
FIG. 2 illustrates an example environment in which systems and/or methods described herein may be implemented.

FIG. 2 is a diagram of an example environment 200 in which systems and/or methods described herein may be implemented. Environment 200 may include a server, such as search system 205, and client 230 connected to network 235. One search system 205 one client 230 have been illustrated as connected to network 235 for simplicity. In practice, environment 200 may include additional clients and/or servers or fewer clients and/or servers. Also, in some instances, a client may perform a function of a server, and a server may perform a function of a client.

Search system 210 may be implemented as a single server device or a collection of server devices that may be co-located or remotely located. Additionally, or alternatively, server 210 may be implemented within a single, common server device or a single, common collection of server devices.

Search system 210 may include server devices that gather, process, search, and/or implement functions in a manner described herein. For example, search system 210 may perform functions described with respect to one or more components described below with respect to FIG. 4. Additional servers, implementing other functions may also be implemented in environment 200. The additional servers may provide, for example, web content, payment services, shopping services, social networking services, etc.

Client 230 may include a client device, such as personal computer, a wireless telephone, a personal digital assistant ("PDA"), a tablet computer, a laptop, or another type of computation or communication device. Client 230 may include user interfaces, such as user interfaces 100 and/or 165, presented through one or more browsers, e.g., web browsers.

Network 235 may include any type of network, such as a local area network ("LAN"), a wide area network ("WAN"), a telephone network—e.g., the Public Switched Telephone Network ("PSTN") or a cellular network—an intranet, the Internet, or a combination of networks. Search system 205 and client 230 may connect to network 235 via wired and/or wireless connections. In other words, any search system 205 and/or client 230 may connect to network 235 via a wired connection, a wireless connection, or a combination of a wired connection and a wireless connection.

Figure 3:
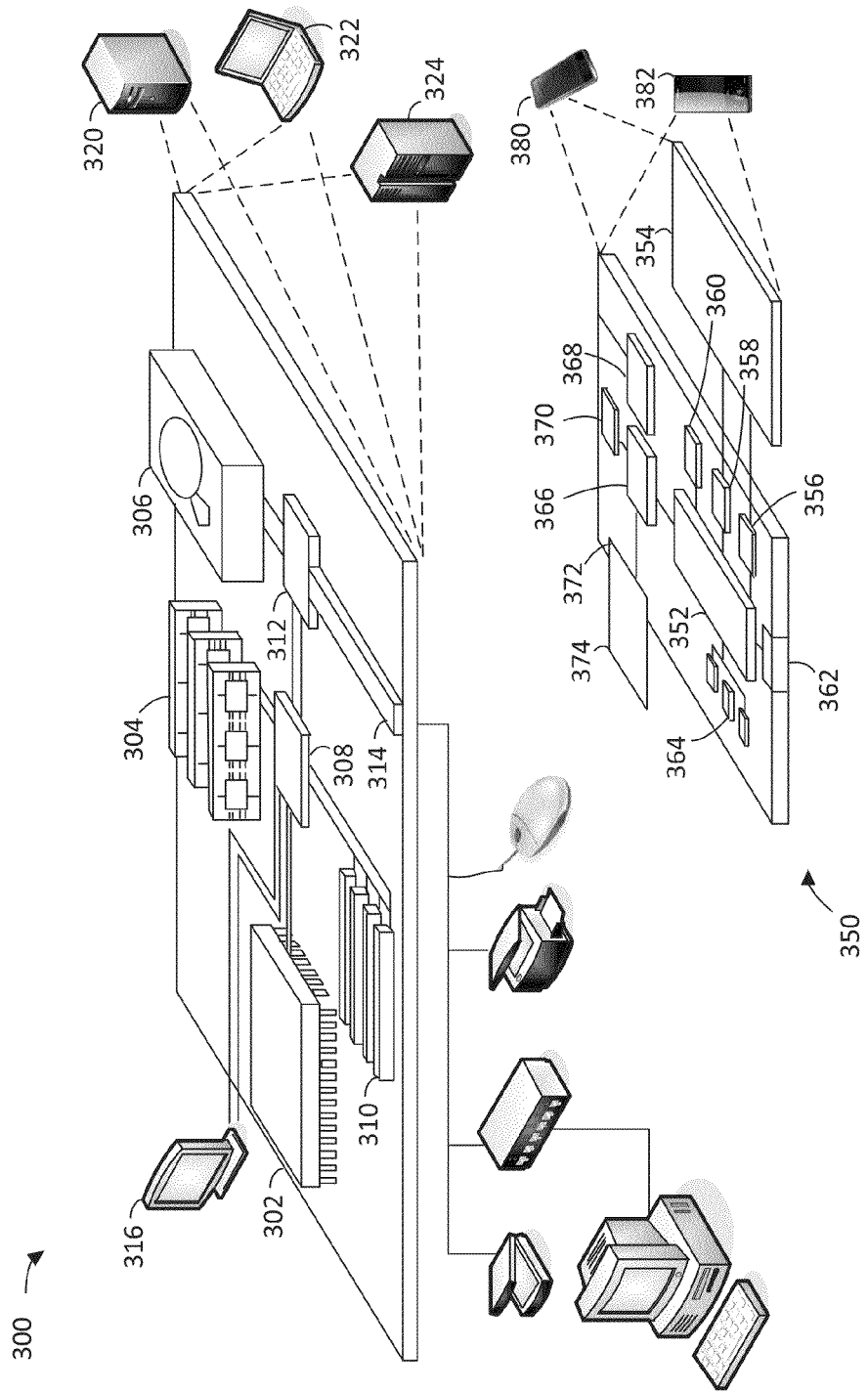
FIG. 3 shows an example of a generic computer device and a generic mobile computer device according to one or more implementations.

FIG. 3 shows an example of a generic computing device 300 and a generic mobile computing device 350, which may be used with the techniques described here. Generic computing device 300 and generic mobile computing device 350 may correspond to, for example, any of search system 205 and/or client 230. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations of the implementations described in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface ("GUI") on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system, etc.

Memory 304 stores information within the computing device 300. In some implementations, memory 304 includes a volatile memory unit or units. In another implementation, memory 304 includes a non-volatile memory unit or units. The memory 304 may also be another form of computer-readable medium, such as a magnetic or optical disk. A computer-readable medium may be defined as a non-transitory memory device. A memory device may include space within a single physical memory device or spread across multiple physical memory devices.

The storage device 306 is capable of providing mass storage for the computing device 300. In some implementations, storage device 306 may be or may include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is an example only. In some implementations, high-speed controller 308 is coupled to memory 304, display 316, e.g., through a graphics processor or accelerator, and to high-speed expansion ports 310, which may accept various expansion cards. In this implementation, low-speed controller 312 is coupled to storage device 306 and low-speed expansion port 314. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device, such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a microdrive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may include appropriate circuitry for driving display 354 to present graphical and other information to a user. Control interface 358 may receive commands from a user and convert them for submission to the processor 352. In addition, an external interface 362 may be provide in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver. In addition, GPS (Global Positioning System) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" and "computer-readable medium" refers to any non-transitory apparatus and/or device, e.g., magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 4:
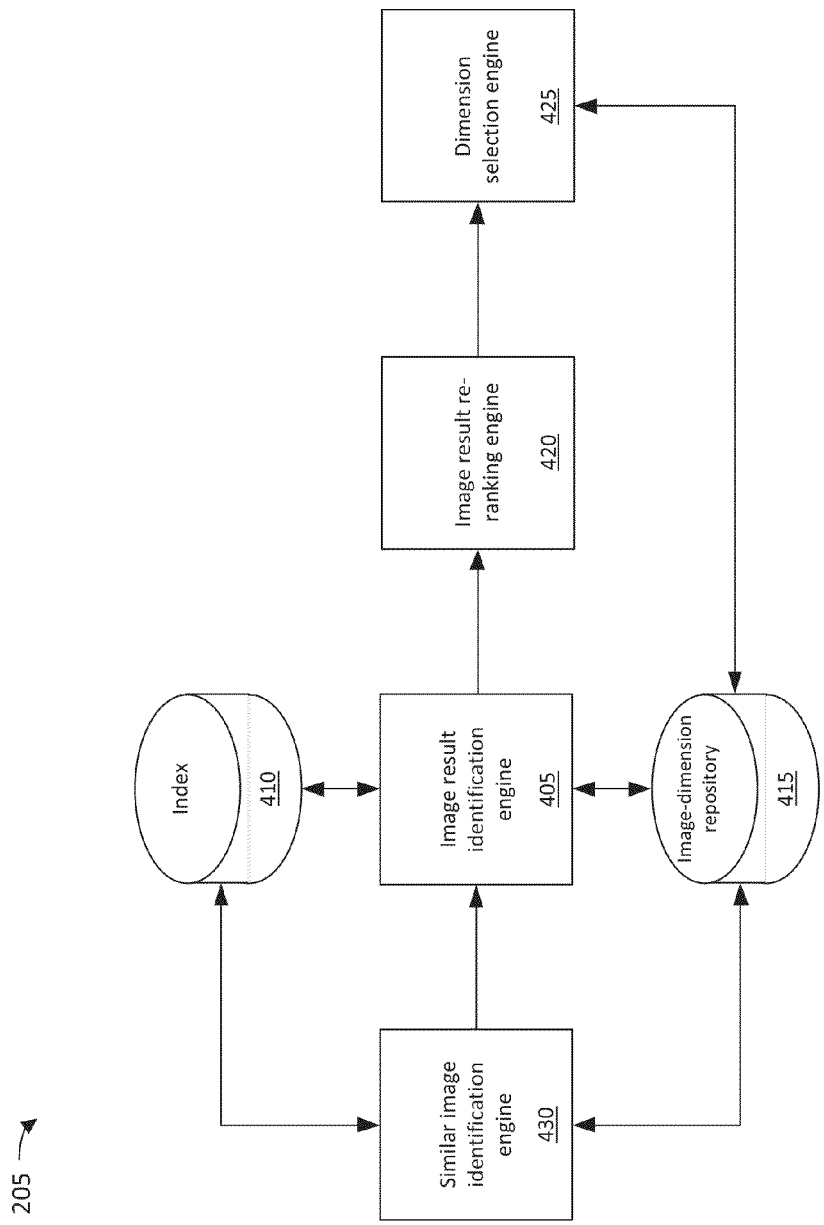
FIG. 4 illustrates example functional components of a search system, according to one or more implementations described herein.

FIG. 4 illustrates example functional components of search system 205, according to one or more implementations described herein. Search system 205 may include image result identification engine 405, index 410, image-dimension repository 415, image result re-ranking engine 420, and dimension selection engine 425. In other implementations, search system 205 may include fewer components, additional components, or different components. Additionally, one or more components shown in FIG. 4 may perform the functions of one or more other components shown in FIG. 4.

Image result identification engine 405 may receive a query image, e.g., from a client device. The query image may be, for example, an image file stored by the client device, captured via an input device, such as a camera, at the client device, etc. The query image may be uploaded by the client device, a link to the query image may be provided by the client device, etc. Additionally, or alternatively, the query image may be presented as an image result, and a user at the client may indicate that the user wishes to view more images similar to the query image.

Image result identification engine 405 may identify a set of image results based on the query image. The image results may include a set of images that are visually similar to the query image. As described further below, in some implementations, image result identification engine 405 may use one or more techniques to determine a respective similarity of each image result to the query image. As also described further below, image result identification engine 405 may rank the image results, based on the respective similarity of each image result, to the query image, using one or more techniques. In some implementations, search system 205 may use these image results to improve the ranking of image results. Additionally, or alternatively, search system 205 may provide these image results to a client, such as the client from which the query image was received.

Image result identification engine 405 may receive the image results from index 410, which may store information regarding images, such as the images themselves and/or links to the images. The images, for which information is stored in index 410, may be images that were identified, e.g., by a web crawler, as being included in documents, such as web pages, news articles, blogs, or the like. In some implementations, index 410 may store images in an original format. That is, index 410 may store the images in a format associated with the images, as identified by the web crawler. For example, if the web crawler identifies that a first image is associated with a first format, index 410 may store the first image in the first format. Further, if the web crawler identifies that a second image is associated with a different second format, index 410 may store the second image in the second format.

Additionally, or alternatively, index 410 may store the images in a different format than the original format associated with the images. That is, while the web crawler may identify that a particular image is associated with a first format, index 410 may store the particular image in a different second format in lieu of, or in addition to, storing the particular image in the first format. In some implementations, index 410 may generate the particular image in the second format by converting the particular image from the first format to the second format. In other implementations, another component may generate the particular image in the second format by converting the particular image from the first format to the second format.

As used above, a format of an image may refer to, for example, an image compression technique. Some image compression techniques may reduce the file size of an image file, without significantly and/or perceptibly impacting the visual representation of the image. Examples of image compression techniques may include Joint Photographic Experts Group ("JPEG"), Graphics Interchange Format ("GIF"), Portable Network Graphics ("PNG"), Tagged Image File Format ("TIFF"), WebP, or the like. An uncompressed image format may include, for example, an uncompressed bitmap image.

In some implementations, an image compression technique may fully represent an image as a set of values, also referred to as dimensions. Thus, one particular attribute of a compressed image may be a dimension of the image. One particular image compression technique may represent each image, compressed using the particular image compression technique, as a set of dimensions. The quantity of dimensions, produced using the particular image compression technique, may be the same from image to image. For example, a first image, generated using the particular image compression technique, may be represented as a set of 59 dimensions. A different second image, generated using the same particular image compression technique, may be represented as a different set of 59 dimensions.

Image-dimension repository 415 may store information associating a particular image with one or more dimensions. As described further below, image result identification engine 405 may receive the information associating the particular image with one or more dimensions, and may use this information when ranking the image results.

Image result re-ranking engine 420 may receive the image results from image result identification engine 405 and may re-rank the image results. In order to re-rank the image results, image result re-ranking engine 420 may form similarity clusters, and group the image results into similarity clusters. In order to form the similarity clusters, image result re-ranking engine 420 may use one or more clustering techniques, such as performing a pair-wise similarity comparison of each image result to each other image, performing spectral clustering, and/or hierarchical clustering. When comparing a particular image result to another particular image result, image result re-ranking engine 420 may compare a distance of each dimension of the two image results. The distance may be a simple difference, a Euclidean distance, or any other type of distance.

For example, assume that the two image results each include 59 dimensions. In some implementations, image result re-ranking engine 420 may compare the distance between a first value, associated with a first dimension of the first image, and a second value, associated with the first dimension of the second image; image result re-ranking engine 420 may compare the distance between a third value, associated with a second dimension of the first image, and a fourth value, associated with the second dimension of the second image; and so on.

Referring to the image results shown in FIG. 1A, image result re-ranking engine 420 may, for example, compare a similarity of image result 110 to each of image results 115-160, may compare a similarity of image result 115 to each of image results 110 and 120-160, and so on. Image result re-ranking engine 420 may form the clusters based on images that are within a particular threshold distance of each of each other. In other words, the formed clusters may include images that are similar to each other, within a particular similarity threshold. Continuing with this example, image result re-ranking engine 420 may form a first cluster that includes image results 110-120, 140, and 150-160; a second cluster that includes image results 125 and 135; a third cluster that includes image 130; and a fourth cluster that includes image result 145.

Image result re-ranking engine 420 may re-rank image results 110-160 using any ranking technique. For example, in some implementations, image result re-ranking engine 420 may rank the clusters based on one or more factors, such as a quantity of image results in each cluster, similarity of the image results in a cluster to the query image, highest ranking image result in the cluster, average ranking of results in the cluster, median ranking of results in the cluster, any combination of the above, etc. For example, image result re-ranking engine 420 may rank the clusters in the following order: first cluster that includes image results 110-120, 140, and 150-160; second cluster that includes image results 125 and 135; third cluster that includes image 130; and fourth cluster that includes image result 145. In such an implementation, image result re-ranking engine 420 may re-rank the image results based on the ranking of the respective cluster in which the image result is included.

Additionally, or alternatively, image result re-ranking engine may rank image results within clusters. For example, in some implementations, image result re-ranking engine may rank image results within clusters based on measure of a similarity between the image results and the query image. Thus, image result re-ranking engine may rank image results based on clusters associated with the image results and/or a measure of similarity between the image results and the query image. As shown in FIG. 1B, image result re-ranking engine 420 may rank the example image results in the following order: 110, 115, 120, 140, 150, 155, 160, 125, 135, 130, and 145.

Dimension selection engine 425 may analyze the re-ranked image results, ranked by image result re-ranking engine 420 220, in order to determine one or more dimensions associated with the query image. As described below, image result identification engine 405 may use the one or more dimensions when ranking image results. When analyzing the re-ranked image results, dimension selection engine 425 may generate a set of T distances between the query image and each image result, where T is a quantity of dimensions associated with an image compression format of the query image. Each set of distances, of the T sets of distances, may be based on a function that more heavily weights a particular dimension than other distances, in the T sets of distances, weight the particular dimension.

For example, the function for a particular distance, of the set of T distances, may be:

$$D_t(x_q,x_i)=d(x_q,x_i)+c^*(x_{q,t}-x_{i,t})^2 \qquad \text{Equation 1:}$$

In Equation 1, $D_t(x_q, x_i)$ may refer to the distance, weighting the dimension t, between a query image $x_q$ and a particular image result $x_i$. Further, d may refer to a distance between the query image $x_q$ and the particular image result $x_i$, c may refer to a constant, $x_{q,t}$ may refer to a value corresponding to the dimension t associated with the query image $x_q$, and $x_{i,t}$ may refer to a value corresponding to the dimension t associated with the particular image result $x_i$. Assuming i is the quantity of image results, each set of distances, in the T sets of distances, may include i distances. Thus, dimension selection engine 425 may generate i*T distances in total.

While the above function was provided as an example, dimension selection engine 425 may generate the distances using any other function, such as one of the following equations:

$$D_t(x_q,x_i)=x_{q,t}-x_{i,t} \qquad \text{Equation 2:}$$

$$D_t(x_q,x_i)=c^*(x_{q,t}-x_{i,t}) \qquad \text{Equation 3:}$$

For each particular set of distances, dimension selection engine 425 may rank the image results according to the respective distances in the particular set of distances. Thus, dimension selection engine 425 may generate T sets of rankings of the image results based on the respective weighted distances of the image results from the query image, with each set of rankings more heavily weighting a different dimension.

Dimension selection engine 425 may compare the respective order of each of the T sets of rankings to the order of the re-ranked results received from image result re-ranking engine 420, in order to determine which set of rankings, of the T sets of rankings, is closest to the re-ranked results received from image result re-ranking engine 420. In some implementations, dimension selection engine 425 may use a Kendall's tau ("Kendall's τ") distance function to determine which set of rankings, of the T sets of rankings, is closest to the re-ranked results received from image result re-ranking engine 420. For example, dimension selection engine 425 may use the Kendall's τ distance function between each set of rankings, of the T set of rankings, and the re-ranked results received from image result re-ranking engine 420. In some implementations, the Kendall's τ distance function may be represented by the following equation:

$$\tau=(P-Q)/(P+Q) \qquad \text{Equation 4:}$$

In Equation 4, τ may represent the distance between a particular set of rankings and the re-ranked results received from image result re-ranking engine 420, P may represent the quantity of concordant pairs of rankings, and Q may represent the quantity of discordant pairs of rankings.

Dimension selection engine 425 may select a particular set of rankings, associated with the highest result of the Kendall's τ distance function between the T sets of rankings and the re-ranked results received from image result re-ranking engine 420. In some implementations, dimension selection engine 425 may identify a dimension associated with the selected particular set of rankings. Additionally, dimension selection engine 425 may provide information associating the identified dimension with the query image to image-dimension repository 415.

For example, in a scenario where the order of a particular set of rankings, of the T sets of rankings, is identical to the order of the re-ranked results received from image result re-ranking engine 420, the Kendall's τ distance function may indicate that the distance between the particular set of rankings and the re-ranked results is a value that reflects that the order of the particular set of rankings is identical to the order of the re-ranked results, such as a value of 1, 100, or another value. In another scenario, where another particular set of rankings, of the T sets of rankings, is in a reverse order, compared to the order of the re-ranked results received from image result re-ranking engine 420, the Kendall's τ distance function may indicate that the distance between the particular set of rankings and the re-ranked results received from image result re-ranking engine 420 is a value that reflects that the order of the particular set of rankings is the reverse of to the order of the re-ranked results, such as a value of 0.

In yet another scenario, assume that some results are ranked the same in a third set of rankings compared to the re-ranked results received from image result re-ranking engine 420, while other results are ranked differently in the third set of rankings compared to the re-ranked results received from image result re-ranking engine 420. In this scenario, the Kendall's τ distance function may indicate that the distance between the particular set of rankings and the re-ranked results received from image result re-ranking engine 420 is a value that is in between the values in the examples described above, such as a value of 0.4, 0.5, 0.6, 40, 50, 60, etc. While the above examples were described in the context of a Kendall's τ distance function, dimension selection engine 425 may determine a similarity between each set of rankings, of the τ set of rankings, and the re-ranked results received from image result re-ranking engine 420 using any function that indicates the similarity.

Image result identification engine 405 may use the identified dimension in subsequent image searches when the same query image is received. For example, assume image result identification engine 405 receives a query image from a client. Image result identification engine 405 may receive an identification of a particular dimension from image-dimension repository 415, and may also receive a set of image results from index 410. Image result identification engine 405 may rank the image results, received from index 410, using a function that weights the particular dimension more heavily than other dimensions. For example, image result identification engine 405 may rank the image results using one or more of Equations 1-3, and/or any other function that weights the particular dimension more heavily than other dimensions. Image result identification engine 405 may provide the ranked image results to the client from which the query image was received.

Additionally, or alternatively, image result identification engine 405 may provide the ranked image results to image result re-ranking engine 420 for further processing, as described above. In some implementations, image result identification engine 405 may provide the ranked image results to image result re-ranking engine 420 for further processing each time image result identification engine 405 ranks the image results. In other implementations, image result identification engine 405 may provide the ranked image results to image result re-ranking engine 420 for further processing every other time that image result identification engine 405 ranks the image results for the particular query image, every three times that image result identification engine 405 ranks the image results for the particular query image, every four times that image result identification engine 405 ranks the image results for the particular query image, etc. In yet another implementation, image result identification engine 405 may forgo providing these ranked images to image result re-ranking engine 420 for further processing.

By providing the image results to image result re-ranking engine 420 for further processing, search system 205 may further improve the ranking performed by image result identification engine 405. For example, over time, dimension selection engine 425 may determine that a particular image is associated with a different dimension than previously identified by dimension selection engine 425. Additionally, or alternatively, dimension selection engine 425 may determine that a particular image is associated with an additional dimension. In such a scenario, image result identification engine 405 may rank image results using a function that weights multiple dimensions more heavily than other dimensions.

Similar image identification engine 430 may receive an image from, for example, a client device, index 410, and/or any other device. Similar image identification engine 430 may determine whether the received image is associated with a selected dimension. For example, similar image identification engine 430 may identify whether image-dimension repository 415 stores information associating the received image, an identical image, and/or a similar image with a dimension. In order to identify whether image-dimension repository 415 stores information associating the received image, an identical image, and/or a similar image with a dimension, image-dimension repository 415 may compare the received image to images for which information is stored in image-dimension repository 415. Image-dimension repository 415 may perform this comparison using one or more image comparison techniques.

When identifying an identical or similar image, image-dimension repository 415 may identify a measure of similarity between the similar or identical image and the received image. In some implementations, image-dimension repository 415 may identify that the similar or identical image is similar or identical to the received image if the measure of similarity exceeds a similarity threshold. In some implementations, if image-dimension repository 415 stores information associating the received image, an identical image, or a similar image with a dimension, search system 205 may forgo subsequently processing the image—e.g., may forgo providing the image to image result identification engine 405 for processing by image result identification engine 405, image result re-ranking engine 420, and/or dimension selection engine 425.

Figure 5:
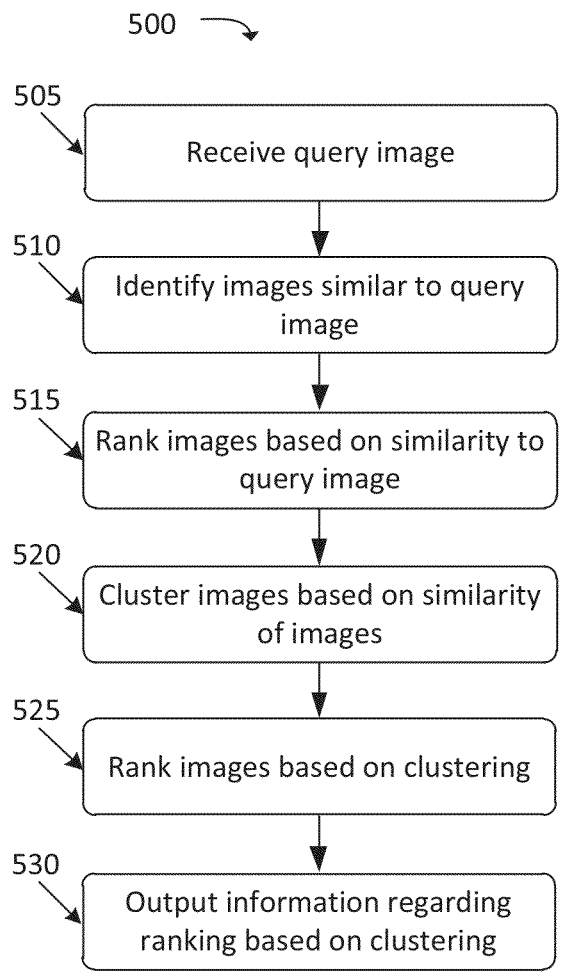
FIG. 5 illustrates a flowchart of an example process for ranking image search results based on clustering, according to one or more implementations described herein.

FIG. 5 illustrates a flowchart of an example process 500 for ranking image search results based on clustering. In some implementations, process 500 may be performed by search system 205. In another implementation, process 500 may be performed by one or more other components instead of, or possibly in conjunction with, search system 205.

Process 500 may include receiving a query image (block 505). For example, as described above with respect to image result identification engine 405, search system 205 may receive a query image from a client, such as client 230. FIGS. 8-11, described below, illustrate examples of receiving a query image, according to one or more implementations.

Process 500 may also include identifying images that are similar to the query image (block 510). For example, as discussed above with respect to image result identification engine 405, search system 205 may identify a set of image results that are similar to the query image. The image results may be a particular quantity of the most similar images to the query image. For example, the image results may be the 100 most similar images, the 1,000 most similar images, etc.

Process 500 may further include ranking the images based on similarity to the query image (block 515). Continuing with the above example, search system 205 may rank the image results using any ranking technique to rank the image results based on similarity to the query image. Search system 205 may, for example, rank the image results based on a distance function that is based on some or all of the dimensions associated with the image results and/or the query image. Additionally, or alternatively, search system 205 may rank the image results, based on similarity to the query image, using a distance function that weights one or more dimensions more heavily than one or more other functions.

Process 500 may additionally include clustering the images based on similarity of the image results to each other (block 520). Continuing with the above example, and as discussed above with respect to image result re-ranking engine 420, search system 205 may generate one or more clusters, based on a similarity of the image results to each other. For instance, as discussed above, search system 205 may perform pair-wise distance comparisons of the image results in order to identify image results that are within a particular distance of each other. In some implementation, search system 205 may cluster the image results that are within the particular distance of each other.

Process 500 may also include ranking the images based on the clustering (block 525). Continuing with the above example, and as discussed above with respect to image result re-ranking engine 420, search system 205 may re-rank image the image results using any ranking technique. For example, as also discussed above, search system 205 may rank the image results within the clusters, and/or may rank the clusters. Search system 205 may re-rank the image results based on the ranks of the image results within the clusters, and/or based on the ranks of the respective clusters.

Process 500 may further include outputting information regarding the ranking based on the clustering (block 530). Continuing with the above example, and as discussed above with respect to image result re-ranking engine 420, search system 205 may provide information regarding the re-ranked image results to one or more other components. Additionally, or alternatively, search system 205 may provide information regarding the re-ranked image results to a client, such as client 230, from which the query image was received.

Figure 6:
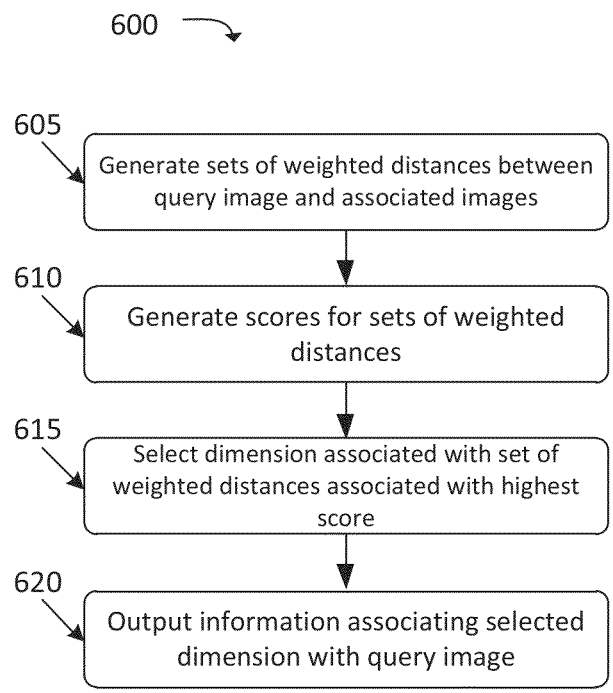
FIG. 6 illustrates a flowchart of an example process for storing information associating a dimension with a query image, according to one or more implementations described herein.

FIG. 6 illustrates a flowchart of an example process 600 for storing information associating a dimension with a query image. In some implementations, process 600 may be performed by search system 205. In another implementation, process 600 may be performed by one or more other components instead of, or possibly in conjunction with, search system 205.

Process 600 may include generating sets of weighted distances between a query image and associated images (block 605). For example, as discussed above with respect to dimension selection engine 425, search system 205 may generate T sets of weighted distances between a query image and image results—e.g., one or more image results identified at block 510. In some implementations, each set, of the T sets of weighted distances, may be weighted based on a particular dimension, of T dimensions. As also discussed above, to generate the T sets of weighted distances, search system 205 may use one or more of Equations 1-3, and/or any other function that weights a particular dimension higher than other dimensions when generating distances.

Process 600 may also include generating scores for the sets of weighted distances (block 610). For example, as also discussed above with respect to dimension selection engine 425, search system 205 may generate a score one or more of the sets of weighted distances generated at block 605, using a function that compares an order of each set of weighted distances to an order of a re-ranked set of image results, such as the re-ranked set of image results identified at block 525. In one example, as discussed above, the score for a particular set of weighted distances may be generated using a Kendall's τ distance function. Additionally, or alternatively, the score for the particular set of weighted distances may be generated using any function that compares an order of the particular set of weighted distances to the order of the re-ranked set of image results.

In some implementations, the highest score, out of the generated scores, for the set of weighted distances may correspond to an order of image results that is closest to the order of the re-ranked set of image results. In some implementations, search system 205 may generate a score for each set of weighted distances, while in other implementations, search system 205 may generate scores for fewer than all of the sets of weighted distances.

Process 600 may further include selecting a dimension associated with a set of weighted distances associated with the highest score (block 615). For example, as further discussed above with respect to dimension selection engine 425, search system 205 may determine which dimension, of the T dimensions, is associated with the set of weighted distances with the highest score. Additionally, or alternatively, search system 205 may determine a particular quantity of dimensions associated with a set of the highest scores. For example, search system 205 may identify the top two scores, the top three scores, etc., and select the dimensions associated with the identified scores.

Additionally, or alternatively, search system 205 may identify a quantity of scores that are within a particular distance from the top score. For example, assume that the particular distance is 10, and that search system 205 has identified scores of 100, 99, 91, 82, and 85. In this example, search system 205 may select the dimensions associated with the scores of 100, 99, and 91.

Process 600 may further include outputting information associating the selected dimension(s) with the query image (block 620). For example, search system 205 may output the information associating the selected dimension(s) with the query image to a repository, such as search system 205. As discussed further below, this information may be used in subsequent image searches.

In some implementations, as discussed above with respect to similar image identification engine 430, search system 205 may forgo performing some or all of process 600 in some scenarios. For example, as described above, search system 205 may identify that a dimension has been previously selected for a query image and/or an identical or similar image. Search system 205 may select the previously selected dimension for the query image, and may output information associating the selected dimension with the query image.

Figure 7:
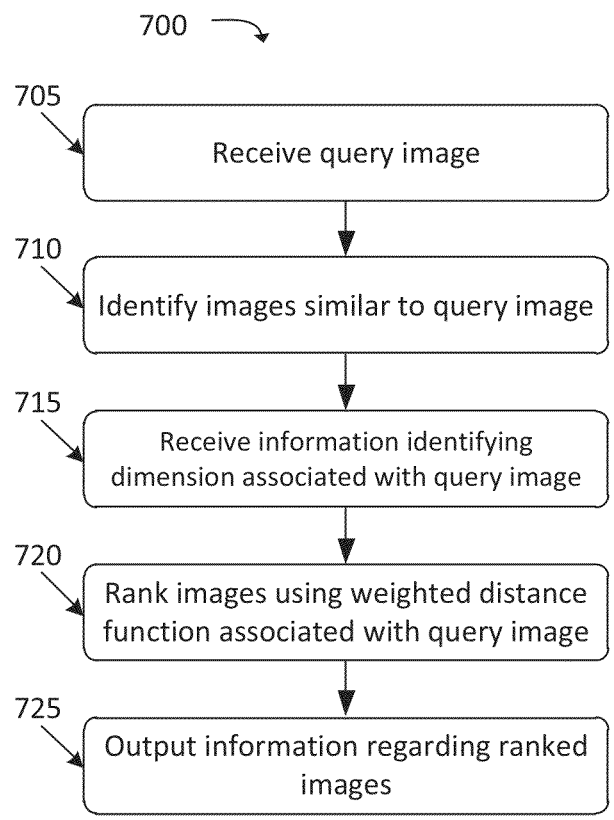
FIG. 7 illustrates a flowchart of an example process for presenting image results, ranked based on a weighted distance function associated with a query image, according to one or more implementations described herein.

FIG. 7 illustrates a flowchart of an example process 700 for presenting image results, ranked based on a weighted distance function associated with a query image. In some implementations, process 700 may be performed by search system 205. In another implementation, process 700 may be performed by one or more other components instead of, or possibly in conjunction with, search system 205.

Process 700 may include receiving a query image (block 705). For example, as described above with respect to image result identification engine 405, sever 305 may receive a query image from a client, such as client 230. Process 700 may also include identifying images results that are similar to the query image (block 710). For example, as further discussed above with respect to image result identification engine 405, search system 205 may identify a set of image results that are similar to the query image. The image results may be a particular quantity of the most similar images, stored by search system 205, to the query image. For example, the image results may be the 100 most similar images, the 1,000 most similar images, etc.

In some implementations, the image results may be the same format as the query image. In such implementations, the image results may be compressed using a compression technique that represents the image results using the same quantity of dimensions as a compression technique that represents the query image.

Process 700 may also include receiving information identifying a dimension associated with the query image (block 715). For example, search system 205 may receive the information identifying the dimension associated with the query image from search system 205. Additionally, or alternatively, search system 205 may receive information identifying more than one dimension associated with the query image from search system 205.

Process 700 may further include ranking the images using a weighted distance function associated with the query image (block 720). Continuing with the above example, search system 205 may use one or more of Equations 1-3, and/or any other function that weights a particular dimension more heavily than other dimensions, to rank the image results.

While examples are provided above with respect to Equations 1-3, other functions may be used when search system 205 receives information identifying multiple dimensions. For example, search system 205 may use one or more of the following equations:

$$D_{t1,2}(x_q,x_i)=d(x_q,x_i)+c^*(x_{q,t1}-x_{i,t1})^2+e^*(x_{q,t2}-x_{i,t2})^2 \quad \text{Equation 5:}$$

$$D_{t1,2}(x_q,x_i)=x_{q,t1}-x_{i,t1}+x_{q,t2}-x_{i,t2} \quad \text{Equation 6:}$$

$$D_{t1,2}(x_q,x_i)=c^*(x_{q,t1}-x_{i,t1})+e^*(x_{q,t2}-x_{i,t2}) \quad \text{Equation 7:}$$

In the above example equations, $D_{t1,2}(x_q, x_i)$ may represent the distance, weighting the dimensions t1 and t2, between a query image $x_q$ and a particular image result $x_i$. Further, e may refer to a constant, $x_{q,t1}$ may refer to a value corresponding to the dimension t1 associated with the query image $x_q$, $x_{i,t1}$ may refer to a value corresponding to the dimension t1 associated with the particular image result $x_i$, $x_{q,t2}$ may refer to a value corresponding to the dimension t2 associated with the query image $x_q$, and $x_{i,t2}$ may refer to a value corresponding to the dimension t2 associated with the particular image result $x_i$. In some implementations, c and e may represent different values. In another implementation, c and e may represent the same values.

Process 700 may additionally include outputting information regarding the ranked images (block 725). Continuing with the above example, search system 205 may provide information regarding the ranked image results to client 230, from which the query image was received. Client 230 may present information regarding some, or all, of the image results via a web browser.

An implementation, described herein, may allow an image search engine to provide image search results that are similar to image search results provided via a clustering and re-ranking technique, without the need for performing clustering and re-ranking in response to receiving a query image. Additionally, the image search engine, of some implementations, may store a relatively small amount of information, which may enable the image search engine to provide the image search results. For example, in an example according to one or more implementations described above, assume that a particular query image is associated with 59 dimensions. The image search engine may store a 6-bit value that identifies a particular dimension, of the 59 dimensions, to weight more heavily when ranking image results.

Furthermore, the image search engine may continuously analyze the query image and associated image results over time to determine which dimension(s) of the image results to more heavily weight. In this sense, the image search engine may continuously learn which dimension(s) of the image results to use, in order to continuously generate more relevant image result rankings for the query image.

Figure 8:
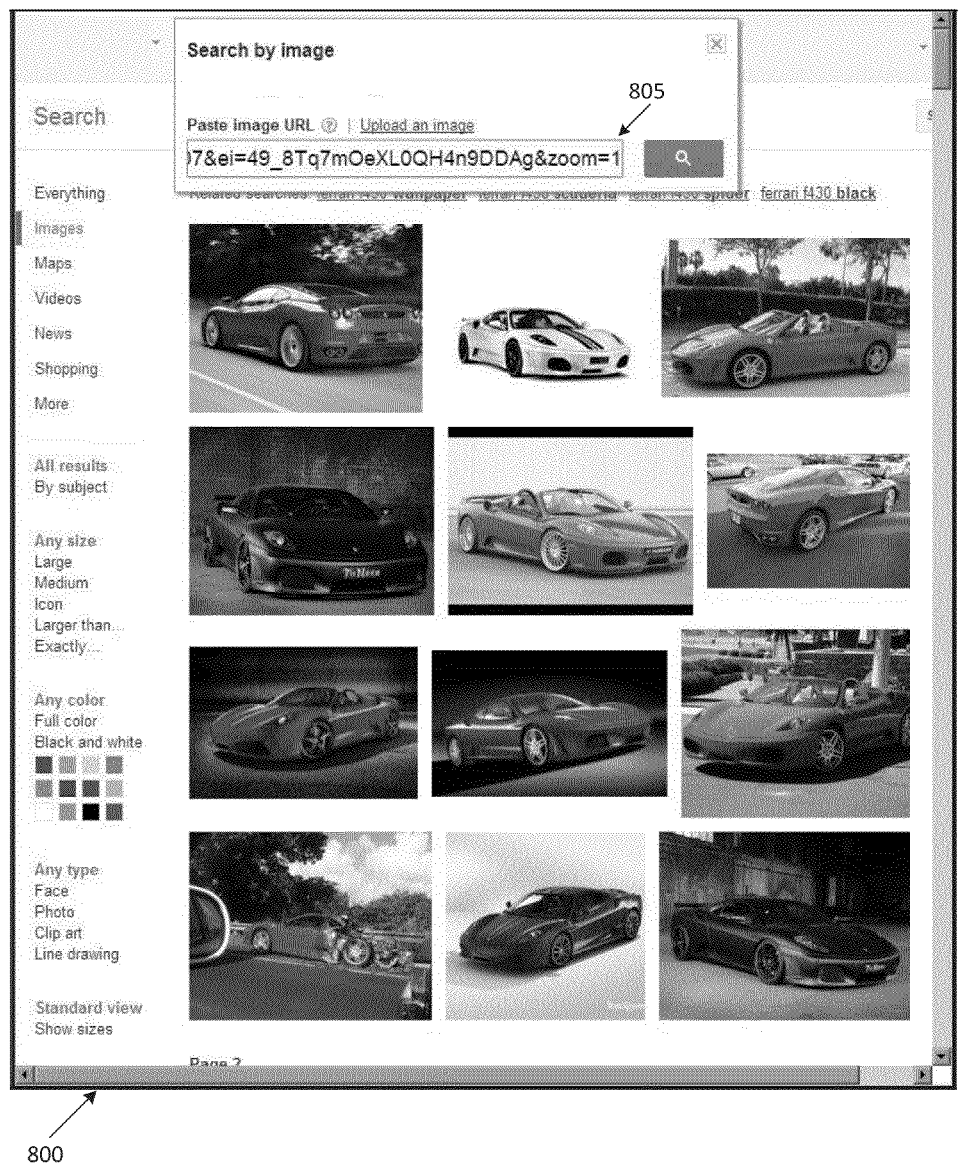
FIGS. 8-11 illustrate examples of receiving a query image, according to one or more implementations described herein.

FIGS. 8-11 illustrate examples of receiving a query image. For example, a query image may be received at block 505 of FIG. 5, and/or at block 705 of FIG. 7. As shown in FIG. 8, a client, such as client 230, may present user interface 800. User interface 800 may include option 805, which allows a user to provide a location identifier, such as a uniform resource locator ("URL"), a uniform resource identifier ("URI"), or some other location identifier, that is associated with a query image.

Figure 9:

Additionally, or alternatively, a client, such as client 230, may present user interface 900, as shown in FIG. 9. User interface 900 may include option 905, which allows a user to upload a query image. The query image may be stored locally at client 230.

Figure 10:
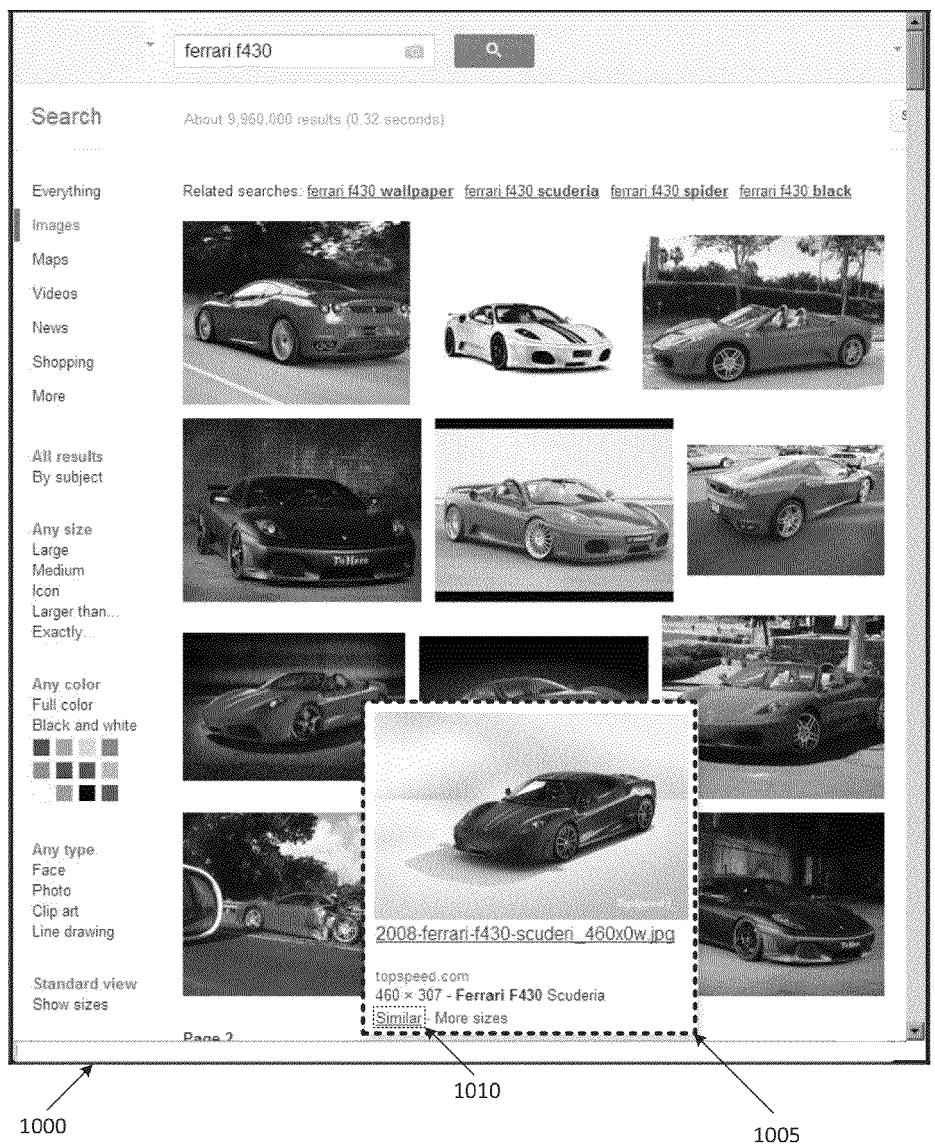

Additionally, or alternatively, a client, such as client 230, may present user interface 1000, as shown in FIG. 10. User interface 1000 may display a set of image results, including image result 1005. User interface 1000 may include option 1010, which allows a user to view images that are visually similar to image result 1005.

Figure 11:
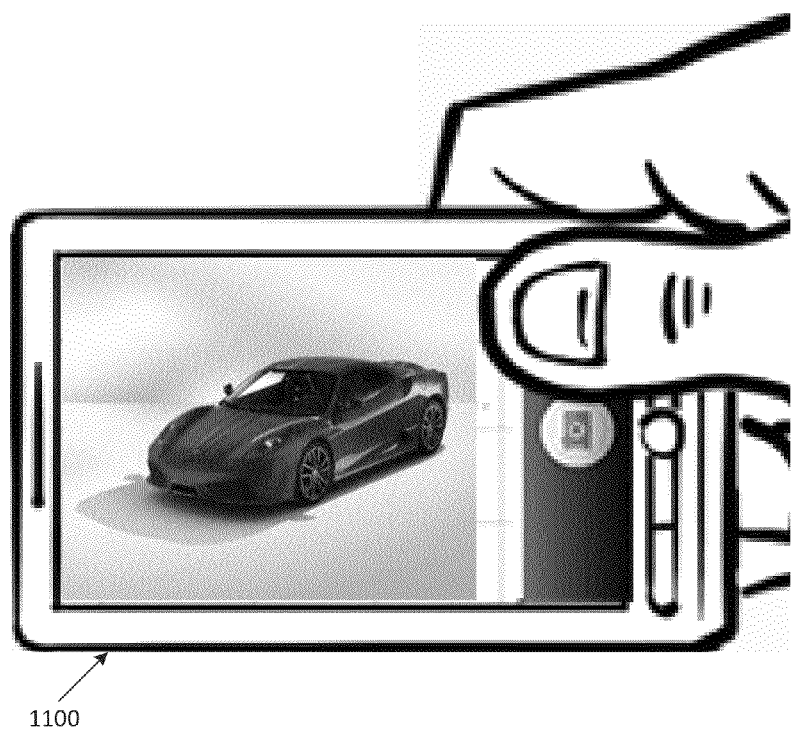

Additionally, or alternatively, as shown in FIG. 11, a client, such as client 230, may allow a user to capture an image via an image capture device associated with client 230. In some implementations, client 230 may include cellular telephone 1100, which may include a camera. Cellular telephone 1100 may allow a user to capture an image via the camera, and search for a visually similar image.

Once a query image is received, e.g., via one or more of the techniques illustrated in FIGS. 8-11, an image search engine may provide a user interface that displays visually similar results. For example, the image search engine may provide user interface 165 in response to receiving a query image via one or more of the techniques illustrated in FIGS. 8-11. The image results displayed in user interface 165 may be ranked according to one or more of the techniques described above—e.g., according to one or more of the processes illustrated in FIGS. 5-7.

Figure 12:
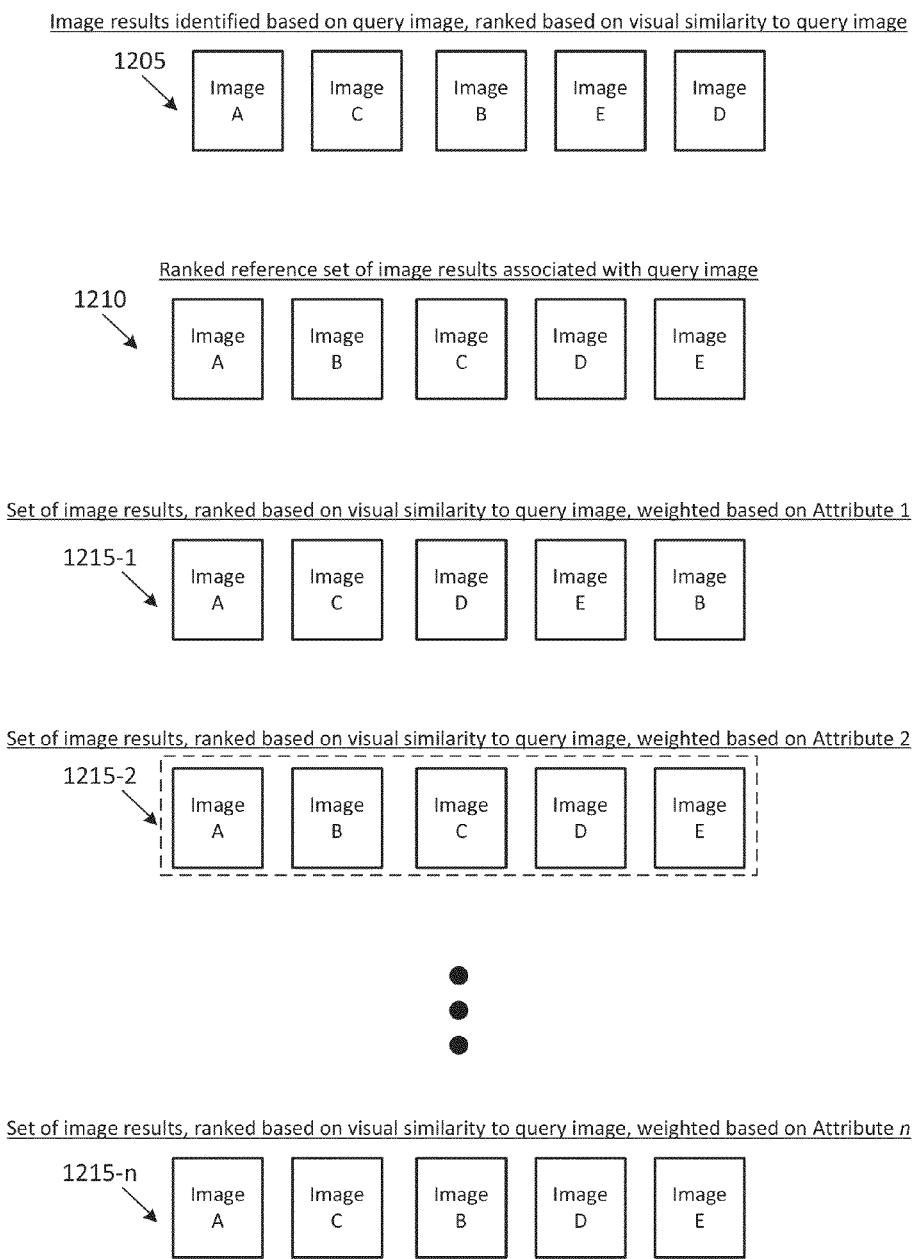
FIG. 12 illustrates an example of selecting an attribute associated with a query image, according to one or more implementations described herein.

FIG. 12 illustrates an example of selecting an attribute associated with a query image. For example, assume that search system 205 receives a particular query image. Search system 205 may identify a set of image results 1205, e.g., at block 510 of FIG. 5. This set of image results 1205 may be ranked based on visual similarity of the image results to the query image, e.g., at block 515 of FIG. 5. Search system 205 may also identify a ranked reference set of image results 1210, which may be associated with the query image—e.g., re-ranked image results generated at block 525 of FIG. 5. As shown in FIG. 12, image results in reference set 1210 may be ordered differently than image results in the set of image results 1205 that are identified based on the query image. Such a situation may occur when images in reference set 1210 are ranked in a manner that is more accurate and/or more desirable than the ranking in set 1205.

Search system 205 may also generate multiple sets of rankings 1215-1 through 1215-*n* of the image results, based on weighting different attributes, such as attributes 1-n. As described above, weighting a particular attribute may include assigning a particular weight to the attribute when determining a distance between the image results and the query image. As also described above, weighting different attributes may yield different sets of rankings, as shown in FIG. 12. In the example shown in FIG. 12, set of rankings 1215-2, weighted based on "Attribute 2," may be a closest set of rankings to reference set of rankings 1210. That is, the order of the image results in set of rankings 1215-2 may be a closest order to the order of image results in reference set of rankings 1210, out of sets of rankings 1215-1 through 1215-*n*. Thus, in some implementations, search system 205 may identify that "Attribute 2" is associated with the query image. Search system 205 may thus weight image results using "Attribute 2" when processing queries based on the query image. By doing so, search system 205 may provide more accurate image result rankings, while saving processing time compared to other techniques.

The foregoing description provides illustration and description, but is not intended to be exhaustive or to limit the implementations to the precise form disclosed. Modifications and variations are possible in light of the above description or may be acquired from practice of the implementations. For example, while series of blocks have been described with regard to FIGS. 5-7, the order of the blocks may be modified in other implementations. Further, non-dependent blocks may be performed in parallel. Additionally, while dimensions were discussed above as one example of an attribute of an image that may be analyzed and/or weighted, other attributes may be analyzed and/or weighted in practice.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited and/or disclosed in the specification, these combinations are not intended to limit the disclosure of the possible implementations. In fact, many of these features may be combined in ways not specifically recited and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
identifying, by one or more server devices, a first plurality of images that are similar to a query image;
generating, by at least one of the one or more server devices, a first ranking of the first plurality of images based on a plurality of image attributes;
generating, by at least one of the one or more server devices and based on the first plurality of images being grouped into a plurality of clusters, a second ranking of the first plurality of images,
each cluster, of the plurality of clusters, including at least one of the first plurality of images, and
the second ranking of the first plurality of images being based on a respective image attribute associated with the each image in each cluster;
comparing, by at least one of the one or more server devices, the first ranking and the second ranking to a reference set of rankings of images;
selecting, based on the comparing and by at least one of the one or more server devices, a particular set of rankings;
ranking, by at least one of the one or more server devices, a second plurality of images, associated with another query image, based on an attribute associated with the selected particular set of rankings; and
providing, by at least one of the one or more server devices and for presentation, the ranked second plurality of images that are associated with the other query image.

2. The method of claim 1, where selecting the particular set of rankings includes:
identifying that an order of images in the particular set of rankings matches an order of images in the reference set more closely than an order of images in another set of rankings.

3. The method of claim 1, where the first plurality of images are grouped into the plurality of clusters by:
ranking the first plurality of images based on a similarity of the first plurality of images to the query image; and
grouping the first plurality of images based on ranking the first plurality of images, and
the method further includes:
generating the reference ranking set by ranking the first plurality of images based on grouping the first plurality of images.

4. The method of claim 1, where the first plurality of images are grouped into the plurality of clusters by:
identifying images, of the first plurality of images, that are visually similar to each other; and
grouping the identified images, of the first plurality of images, that have been identified as being visually similar to each other.

5. The method of claim 1, where generating the second ranking of the first plurality of images includes:
identifying, for each cluster, a similarity score based on a similarity of at least one image in each cluster to the query image; and
generating the second ranking of the first plurality of images based on similarity scores of respective clusters associated with the first plurality of images.

6. The method of claim 1, where the other query image is identical to the query image.

7. The method of claim 1, further comprising:
receiving an additional query image;
determining that the additional query image is identical to or similar to the query image; and
storing information associating a particular attribute with the additional query image based on determining that the additional query image is identical to or similar to the query image.

8. A system comprising:
one or more devices to:
identify a first plurality of images that are similar to a query image;
generate a first ranking of the first plurality of images based on a plurality of image attributes;
generate, based on the first plurality of images being grouped into a plurality of clusters, a second ranking of the first plurality of images,
each cluster, of the plurality of clusters, including at least one of the first plurality of images, and
the second ranking of the first plurality of images being based on a respective image attribute associated with the each image in each cluster;

compare the first ranking and the second ranking to a reference set of rankings of images;
select, based on the comparing, a particular set of rankings;
rank a second plurality of images, associated with another query image, based on an attribute associated with the selected particular set of rankings; and
provide, for presentation, the ranked second plurality of images that are associated with the other query image.

9. The system of claim 8, where, when selecting the particular set of rankings, the one or more devices are further to:
identify that an order of images in the particular set of rankings matches an order of images in the reference set more closely than an order of images in another set of rankings.

10. The system of claim 8, where the one or more devices are further to:
group the first plurality of images into the plurality of clusters,
the one or more devices, when grouping the first plurality of images into the plurality of clusters, being to:
rank the first plurality of images based on a similarity of the first plurality of images to the first query image;
group the first plurality of images based on ranking the first plurality of images, and
generate the reference ranking set by ranking the first plurality of images based on grouping the first plurality of images.

11. The system of claim 10, where, when grouping the first plurality of images into the plurality of clusters, the one or more devices are further to:
identify images, of the first plurality of images, that are visually similar to each other; and
group the identified images, of the first plurality of images, that have been identified as being visually similar to each other.

12. The system of claim 8, where, when generating the second ranking of the first plurality of images, the one or more devices are further to:
identify, for each cluster, a similarity score based on a similarity of at least one image in each cluster to the query image; and
generate the second ranking of the first plurality of images based on similarity scores of respective clusters associated with the first plurality of images.

13. The system of claim 8, where the other query image is identical to the query image.

14. The system of claim 8, where the one or more devices are further to:
receive an additional query image;
determine that the additional query image is identical to or similar to the query image; and
store information associating a particular attribute with the additional query image based on determining that the additional query image is identical to or similar to the query image.

15. A computer-readable medium comprising:
one or more computer-executable instructions, which, when executed by one or more processors, cause the one or more processors to:
identify a first plurality of images that are similar to a query image;
generate a first ranking of the first plurality of images based on a plurality of image attributes;
generate, based on the first plurality of images being grouped into a plurality of clusters, a second ranking of the first plurality of images,
each cluster, of the plurality of clusters, including at least one of the first plurality of images, and
the second ranking of the first plurality of images being based on a respective image attribute associated with the each image in each cluster;
compare the first ranking and the second ranking to a reference set of rankings of images;
select, based on the comparing, a particular set of rankings;
rank a second plurality of images, associated with another query image, based on an attribute associated with the selected particular set of rankings; and
provide, for presentation, the ranked second plurality of images that are associated with the other query image.

16. The computer-readable medium of claim 15, where the one or more instructions to select the particular set of rankings include:
one or more instructions to identify that an order of images in the particular set of rankings matches an order of images in the reference set more closely than an order of images in another set of rankings.

17. The computer-readable medium of claim 15, where the instructions further include:
one or more instructions to group the first plurality of images into the plurality of clusters,
the one or more instructions to group the first plurality of images into the plurality of clusters including:
one or more instructions to rank the first plurality of images based on a similarity of the first plurality of images to the query image; and
one or more instructions to group the first plurality of images based on ranking the first plurality of images, and
one or more instructions to generate the reference ranking set by ranking the first plurality of image based on grouping the first plurality of images.

18. The computer-readable medium of claim 17, where the one or more instructions to group the first plurality of images into the plurality of clusters include:
one or more instructions to identify images, of the first plurality of images, that are visually similar to each other; and
one or more instructions to group the identified images, of the first plurality of images, that have been identified as being visually similar to each other.

19. The computer-readable medium of claim 15, where the one or more instructions to generate the second ranking of the first plurality of images include:
one or more instructions to identify, for each cluster, a similarity score based on a similarity of at least one image in each cluster to the query image; and
one or more instructions to generate the second ranking of the first plurality of images based on similarity scores of respective clusters associated with the first plurality of images.

20. The computer-readable medium of claim 15, where the other query image is identical to the query image.

* * * * *